(12) United States Patent
Hogen et al.

(10) Patent No.: US 7,520,606 B2
(45) Date of Patent: Apr. 21, 2009

(54) EYEWEAR AND METHODS OF USE

(75) Inventors: John E. G. Hogen, Reno, NV (US); Johnny Garfield Wong, Long Beach, CA (US)

(73) Assignee: Pan-Optx, Inc., Pleasanton, CA (US)

( * ) Notice: Subject to any disclaimer, the term of this patent is extended or adjusted under 35 U.S.C. 154(b) by 112 days.

(21) Appl. No.: 11/715,070

(22) Filed: Mar. 6, 2007

(65) Prior Publication Data

US 2008/0218682 A1 Sep. 11, 2008

(51) Int. Cl.
G02C 5/16 (2006.01)

(52) U.S. Cl. ...................................... 351/113; 351/114

(58) Field of Classification Search ................. 351/111, 351/113, 114, 116–119, 121, 123
See application file for complete search history.

(56) References Cited

U.S. PATENT DOCUMENTS

| 27,359 | A | * | 3/1860 | Gordon et al. ............... 351/118 |
|---|---|---|---|---|
| 3,544,204 | A | | 12/1970 | Bienenfeld |
| 3,545,848 | A | | 12/1970 | Sebastian |
| 3,556,644 | A | | 1/1971 | Stahl |
| 3,666,355 | A | | 5/1972 | Griffith |
| 3,667,834 | A | | 6/1972 | Davidson et al. |
| 3,873,192 | A | | 3/1975 | Anderson |
| 3,923,384 | A | | 12/1975 | LeBlanc |
| 4,047,809 | A | | 9/1977 | Zuccatti |
| 4,804,260 | A | | 2/1989 | Anger |
| 4,848,891 | A | | 7/1989 | Lee |
| 4,946,268 | A | | 8/1990 | Nowottny et al. |
| 4,955,708 | A | | 9/1990 | Kahaney |
| 5,056,907 | A | | 10/1991 | Weber |
| 5,133,595 | A | | 7/1992 | Gutbroad et al. |
| 5,347,325 | A | | 9/1994 | Lei |
| 5,448,317 | A | | 9/1995 | Huang |
| 5,457,505 | A | | 10/1995 | Canavan et al. |
| 5,532,767 | A | | 7/1996 | Pleune et al. |
| 5,668,619 | A | | 9/1997 | Bolle |
| 5,796,461 | A | | 8/1998 | Stepan |
| 5,929,966 | A | | 7/1999 | Conner |
| 6,036,310 | A | | 3/2000 | Moetteli |
| 6,059,411 | A | | 5/2000 | Moody |
| 6,106,116 | A | | 8/2000 | Houston |
| 6,322,211 | B1 | | 11/2001 | Desy |
| 6,409,336 | B1 | | 6/2002 | Kuo |
| 6,719,425 | B2 | | 4/2004 | Conner |

(Continued)

FOREIGN PATENT DOCUMENTS

GB 2116887 5/1986

*Primary Examiner*—Huy K Mai
(74) *Attorney, Agent, or Firm*—Holland & Hart, LLP

(57) ABSTRACT

Described herein are various embodiments of eyewear provided for advantageous use in sports and work, as well as in casual activity, and, if desired, in conjunction with helmets or other headgear. According to one exemplary embodiment, eyewear can include a frame and respective spaced-apart temple portions coupled to the frame. Each temple portion can include a proximal portion, a distal portion, and a biasing element that is movable along at least the distal portion in a longitudinal direction of the temple portion. Each biasing element can urge the distal portion of the respective temple portion in a lateral direction, which is generally perpendicular to the longitudinal direction, as the biasing element is moved along the distal portion.

21 Claims, 3 Drawing Sheets

U.S. PATENT DOCUMENTS

| | | |
|---|---|---|
| 6,752,496 B2 | 6/2004 | Conner |
| 6,929,364 B1 | 8/2005 | Jannard |
| 7,104,646 B2 | 9/2006 | Yang |
| 2002/0047985 A1* | 4/2002 | Hollins ........................ 351/114 |
| 2005/0270477 A1 | 12/2005 | Curci et al. |
| 2005/0280772 A1 | 12/2005 | Hammock et al. |

* cited by examiner

EYEWEAR AND METHODS OF USE

FIELD

This disclosure pertains to eyeglasses and analogous eyewear, especially for use while the wearer is engaged in vigorous activity such as any of various sports, or during any other time when a secure fit to the wearer's head is desired or necessary.

BACKGROUND

Wearing of eyeglasses and the like while engaged in vigorous activity can be difficult for various reasons.

One reason is a fundamental inability of most eyeglass frames to remain properly attached to the wearer's face whenever the wearer is engaged in activity including rapid or extensive movements of the head and/or body. A conventional eyeglass having this disadvantage likely will become detached from the wearer's face in such instances.

Another reason is a general discomfort associated with wearing eyeglasses in conjunction with a helmet, hat or other headgear, which is commonly worn when participating in vigorous activities, such as skiing, bike riding, rafting, climbing, motorcycling, etc. When both eyeglasses and a helmet are worn, the helmet can apply pressure on the ears, which in turn causes the ears to press against the temple pieces of the eyeglasses. With many known eyeglass designs, temple pieces can be bulky or non-conforming to a user's head such that when worn with a helmet, the ears and head can be uncomfortably and often painfully pressed against the temple pieces. Further, some devices and mechanisms coupled to the temple pieces and designed to keep the eyeglasses on the wearer's face (see below) act only to magnify this discomfort by adding to the bulk of the temple pieces.

Many people wear eyeglasses for reasons other than, or in addition to, vision correction. Well-known examples are the large number of different types of "sunglasses" that reduce the intensity (and/or change the wavelength) of light reaching the wearer's eyes. Other well-known examples are so-called "safety glasses" usually used for eye protection in industrial and laboratory environments. Yet other well-known examples are various "goggles" and the like.

As used herein, "eyewear" generally encompasses all of various eyeglass types summarized above as well as any other analogous device configured to fit to a person's face and that includes a "frame" and "lenses." The frame typically has a front portion situated largely in front of the wearer's eyes. The lenses are mounted to the front portion and transmit at least some light to the wearer's eyes. Mounted to the front portion are "temple pieces" that extend rearward from the front portion to engage and/or rest upon the wearer's ears. The temple pieces usually, but not necessarily, are hinged to the front portion.

To address the concerns raised by the need for eyewear that will remain on the wearer's face during vigorous activity, various schemes have been adopted. For example, certain types of eyewear, notably goggles and certain types of eyeglasses, employ a strap, elastic band, cord, or analogous feature (usually adjustable) that extends fully around the rear of the wearer's head, rearwardly of the ears. Unfortunately, although these features are effective, they can be uncomfortable and are usually not favored for use when style is important. Also, eyewear with this feature is difficult to put on and take off, especially when the wearer is also wearing a hat or helmet. Other types of eyewear have temple pieces with wire-like, semicircular, "wrap-around" ear-engaging portions that curve downward fully behind the wearer's ears. Unfortunately, again, eyeglasses having these types of temple pieces are difficult to put on or take off, especially in situations in which the wearer is also wearing a hat or helmet.

Many other schemes have been tried to improve the fit of eyeglass frames to the wearer. For example, a first scheme involves making the temple pieces adjustable lengthwise, such as discussed in U.S. Pat. Nos. 4,955,708; 6,322,211; 6,409,336; 5,929,966; 4,946,268; 4,047,809; 5,347,325; 5,668,619; 5,056,907; 3,556,644; 3,544,204; 3,545,848; 6,752,496; 6,719,425; 6,059,411; 5,448,317; 5,133,595; 4,804,260; 3,873,192; 3,667,834; and 3,666,355, as well as U.S. Patent Publication No. 2005/0280772. A second scheme involves making the frame-width adjustable, such as discussed in U.S. Patent Publication No. 2005/0270477. A third scheme involves both making the temple pieces adjustable lengthwise and making their pantoscopic angle (relative to the front portion) adjustable, such as discussed in U.S. Pat. Nos. 5,796,461; 5,457,505; 5,532,767; and 7,104,646. A fourth scheme involves temples with "wrap-around" ends that can be temporarily straightened to facilitate donning and removing the eyeglass. Unfortunately, these various schemes tend to be highly specialized and do not address all needs, especially needs posed by concepts of style and utility that arise with modern sports eyeglasses.

SUMMARY

Described herein are various embodiments of eyewear provided for advantageous use in sports and work, as well as in casual activity. The eyewear can have a temple piece that is adjustable to provide a customizable and comfortable fit for a user, i.e., wearer of the eyewear.

According to one exemplary embodiment, eyewear can include a frame and respective spaced-apart temple portions coupled to the frame. Each temple portion can include a proximal portion, a distal portion, and a biasing element that is movable along at least the distal portion in a longitudinal direction of the temple portion. Each biasing element can urge the distal portion of the respective temple portion in a lateral direction, which is generally perpendicular to the longitudinal direction, as the biasing element is moved along the distal portion.

In some implementations, each biasing element can be an elongate leaf spring. In certain embodiments, the biasing elements can urge the respective distal portions of the temple portions toward or away from each other.

In some implementations, each temple portion includes a respective detent mechanism that is matingly engageable with the respective biasing element. In specific implementations, the detent mechanism retains the biasing element adjustably in one of at least two positions. In other specific implementations, the detent mechanism retains the biasing element adjustably in any of an infinite number of positions.

In some implementations, the biasing element can be selectively movable into one of at least two positions along the distal portion. When the biasing element is in a first of the at least two positions, the distal portion can be in a first lateral-flex position, and when the biasing element is in a second of the at least two positions, the distal portion can be in a second lateral-flex position.

In some implementations, each temple portion can include a cavity. In such implementations, at least a portion of a respective biasing element can be slidably retained within the cavity. In a specific implementation, the distal portion of each temple portion can include an outer portion made of a first material and an inner portion made of a second material. The second material can be more flexible than the first material and the cavity can be defined between the outer portion and the inner portion.

According to another exemplary embodiment, a temple piece for use with eyewear can include an elongate body and an elongate leaf spring. The elongate body can extend longitudinally from a first end to a second end and further define an elongate cavity that extends at least partially between the first and second ends. The elongate leaf spring can have first and second ends and extend longitudinally from the first end to the second end. In certain instances, the leaf spring can be at least partially positioned within the elongate cavity such that the second end of the leaf spring is closer than the first end to the second end of the body. Further, the leaf spring can be slidable toward and away from the respective first and second ends of the body. The second end of the leaf spring can be biased in a first direction relative to the first end of the leaf spring. As the leaf spring slides toward the second end of the body, the second end of the leaf spring can urge the second end of the body in the first direction. In contrast, as the leaf spring slides toward the first end of the body, the second end of the leaf spring can urge the second end of the body in a second direction generally opposite the first direction.

In some implementations, the elongate body can include a proximal portion that extends from the first end and a distal portion that extends from the second end. The proximal portion can be made from a first material and the distal portion can include an outer side portion made from the first material and an inner side portion made from a second material that is more flexible than the first material. In certain implementations, the cavity can be defined at least partially between the outer side portion and the inner side portion of the distal portion.

In other implementations, the body can define a slot that extends along at least a portion of the elongate cavity. The elongate leaf spring can include a user-engaging portion that extends through and is movable within the slot. The user-engaging portion can be manipulated by a user to adjust the position of the leaf spring relative to the body. In specific implementations, the body can include at least two detents adjacent the slot and being configured to engage and at least partially retain the user-engaging portion of the leaf spring. In other specific implementations, the slot can be positioned on an inner side of the body and the user-engaging portion can extend at least partially from the inner side of the body.

In some implementations, the leaf spring can be longitudinally slidable between a first longitudinal position and a second longitudinal position. In the first longitudinal position, the second end of the body is urged into a first lateral position. In the second longitudinal position, which is longitudinally spaced apart from the first longitudinal position, the second end of the body is urged into a second lateral position laterally spaced apart from the first lateral position.

In yet other implementations, the leaf spring can be selectively adjustable into one of at least two positions relative to the body to place the second end of the body in a corresponding one of at least two positions relative to the first end of the body.

According to another embodiment, a method for adjusting fit of an eyewear to a wearer can include providing an eyewear that includes a lens portion and respective spaced-apart temple portions coupled to the lens portion. Each temple portion can include a spring that is selectively movable in a longitudinal direction and biased to urge a distal portion of the respective temple portion in a direction substantially transverse to the longitudinal direction. The method can further include moving the movable spring of at least one of the temple portions in the longitudinal direction to urge the distal portion of the at least one of the temple portions in the transverse direction.

In some implementations, moving can include moving the movable spring of one temple portion in the longitudinal direction to urge the distal portion of the one temple portion in the transverse direction toward the other of the temple portions. In other implementations, moving can include moving the movable spring of one temple portion in the longitudinal direction to urge the distal portion of the one temple portion in the transverse direction away from the other of the temple portions.

In some implementations, each of the spaced-apart temple portions can include a detent mechanism having at least two detents. The detents are engageable with a portion of the spring to at least partially retain the spring in a respective one of at least two longitudinal positions and at least partially maintain the distal portion in a corresponding one of at least two lateral-flex positions. The method can further include disengaging the portion of the spring from a first detent and engaging the portion of the spring with a second detent to move the distal portion from a first lateral-flex position to a second lateral-flex position.

In certain implementations, the eyewear can be adjusted if desired to comfortably wear a helmet or other headgear at least partially over the eyewear.

It is to be understood that the foregoing is a summary of certain aspects or features of embodiments disclosed herein. Embodiments of the invention need not necessarily include all such aspects or features or address issues noted in the Background. The foregoing and other features and advantages will become more apparent from the following detailed description, which proceeds with reference to the accompanying figures.

BRIEF DESCRIPTION OF THE DRAWINGS

The preferred and other embodiments are shown in the accompanying drawings wherein.

DETAILED DESCRIPTION

This disclosure is set forth in the context of representative embodiments that are not intended to be limiting in any way.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Figure 1A:
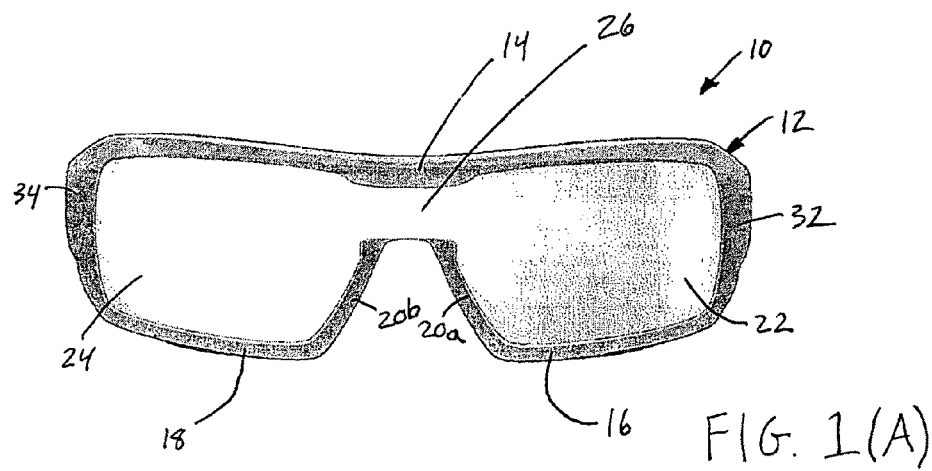
FIG. 1(A) is a front view of an eyeglass according to one embodiment of the present disclosure.

A representative embodiment of an eyeglass is depicted in FIGS. 1(A)-1(D). Turning first to FIG. 1(A), the eyeglass 10 comprises a substantially rigid frame 12. The frame 12 is configured to be situated, when fitted to a wearer's face, at least in front of the wearer's face at about eye level. The frame 12 defines a bridge 14 that connects together a left lens mounting 16 and a right lens mounting 18. The frame 12 also comprises nose-pad regions 20a, 20b. Each lens mounting 16, 18 accommodates a respective lens portion 22, 24 (each portion 20, 22 generally being a respective "lens" because it is intended to pass light to a respective eye). In this embodiment the lens portions 22, 24 include an integral connecting portion 26 that extends along the bridge 14. Hence, the lens portions 22, 24 are an integral unit. However, in alternative configurations, the lens portions can be individual respective units.

Figure 1B:
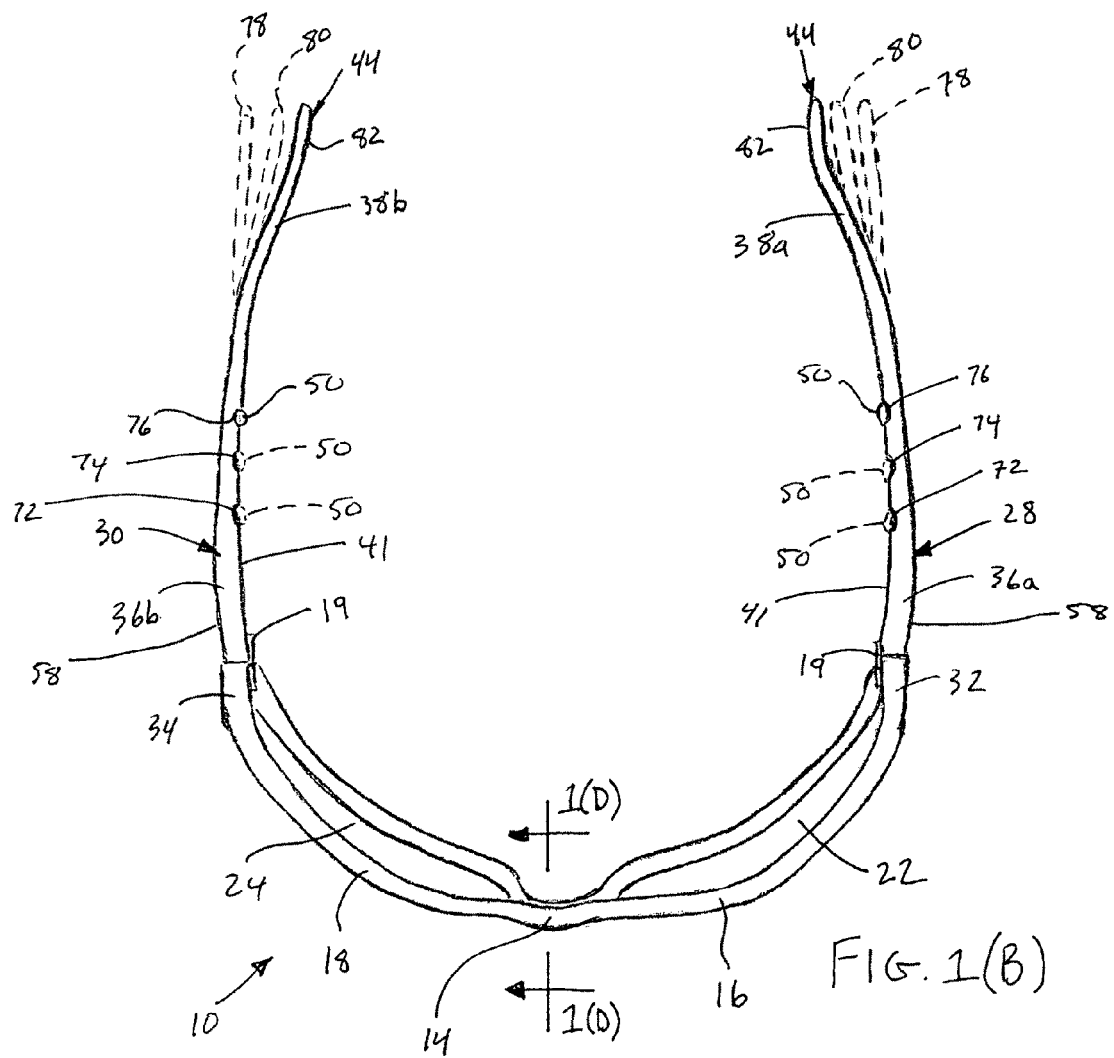
FIG. 1(B) is a top view of the eyeglass of FIG. 1(A).
Figure 1C:
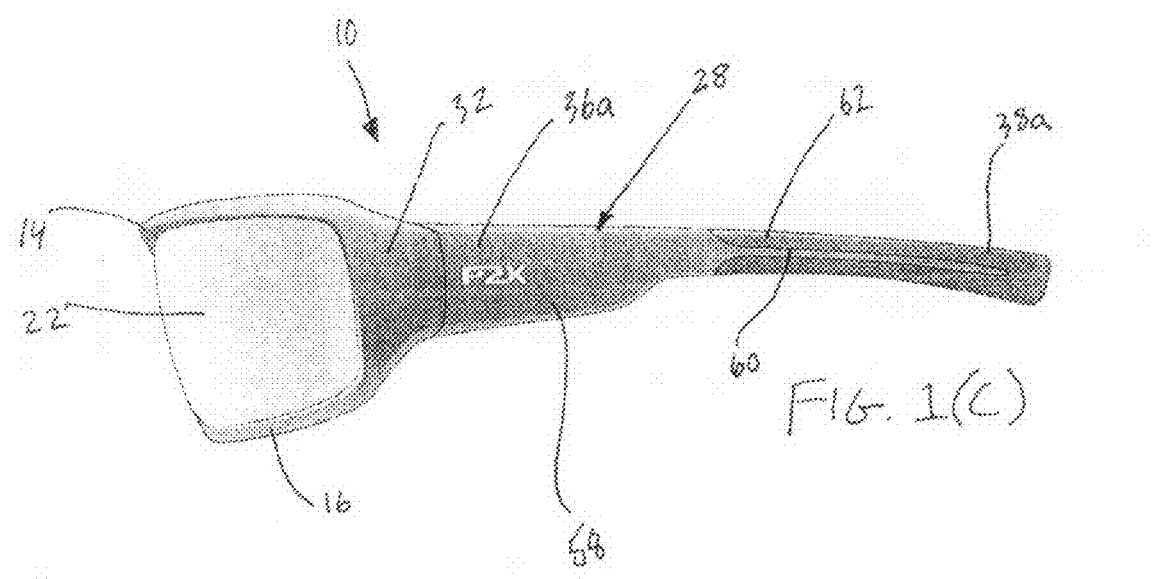
FIG. 1(C) is a side view of the eyeglass of FIG. 1(A).
Figure 1D:
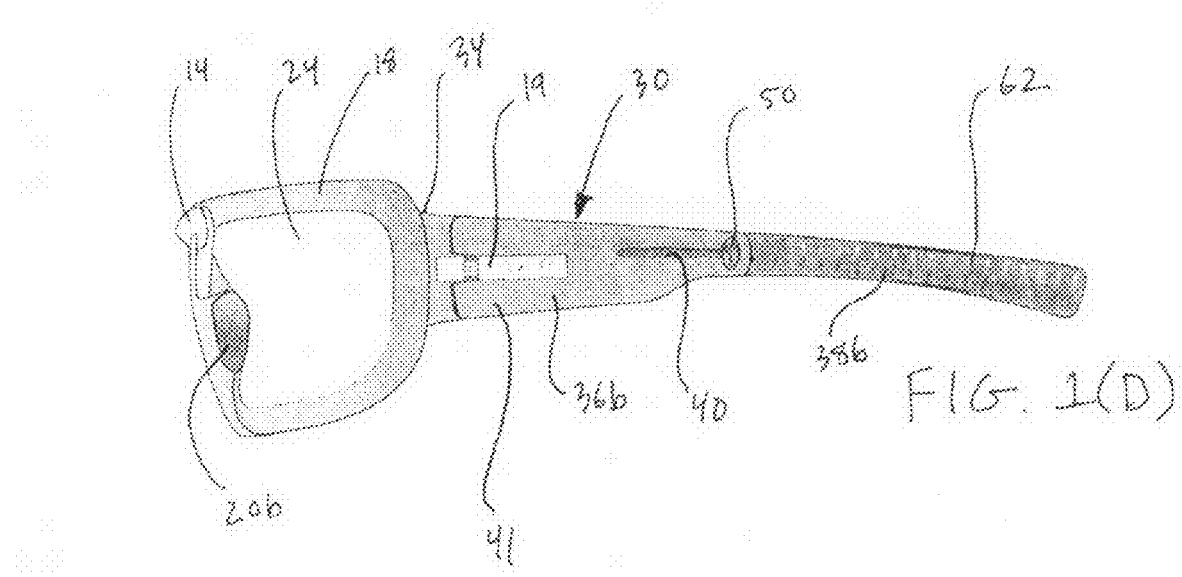
FIG. 1(D) is a cross-sectional side view of the eyeglass of FIG. 1(A) taken along the line 1(D)-1(D) of FIG. 1(B).

FIG. 1(B) shows the top of the frame 12 in general, as well as the top of the bridge 14 and lens mountings 16, 18. The frame 12 (principally the lens mountings 16, 18 thereof, beginning at the bridge 14) curves rearwardly in a manner that follows the curve of the wearer's face, but without actually contacting the wearer's face. Attached to the frame are a left temple piece 28 and a right temple piece 30. In the illustrated embodiment, the temple pieces 28, 30 are hingeably mounted to respective lateral edges 32, 34 of the frame 12 via a hinge mechanism, such as hinge 19.

The temple pieces 28, 30 include respective proximal portions 36a, 36b and respective distal portions 38a, 38b. The proximal portions 36a, 36b are hingeably mounted to the respective lateral edges 32, 34, and the distal portions 38a, 38b are configured at least to rest upon the wearer's ears. In this embodiment the proximal portions 36a, 36b are substantially rigid and in this regard can be made of the same material as the frame 12 (e.g., a rigid plastic material). The distal portions 38a, 38b are flexible, as described further below, and can have a thin profile when viewed in plan from above. At about the junction of the proximal portion 36a, 36b and the distal portion 38a, 38b of each temple piece 28, 30, respectively, is a respective slot 40 (see FIG. 1(D)). As shown, the slot 40 is formed in an inner side 41 of the respective temple pieces 28, 30 (i.e., a side generally facing the wearer's head when the eyeglass is worn by the wearer). However, in other embodiments, slots can be formed in the inner surface and an outer surface of the temple pieces, or alternatively, in only the outer surface of the temple pieces.

Although the temple pieces 28, 30 are shown hingeably mounted to the lateral edges 32, 34 in the illustrated embodiment, in other embodiments, the temple pieces can be movably mounted to the lateral edges of the frame using a coupling technique other than a hinged connection. In yet other embodiments, the temple pieces 28, 30 can be immovably mounted to the lateral edges 32, 34 of the frame 12, such as by forming an integral, or one-piece, unit with the lateral edges and thus the other respective portions of the frame.

Figure 2A:
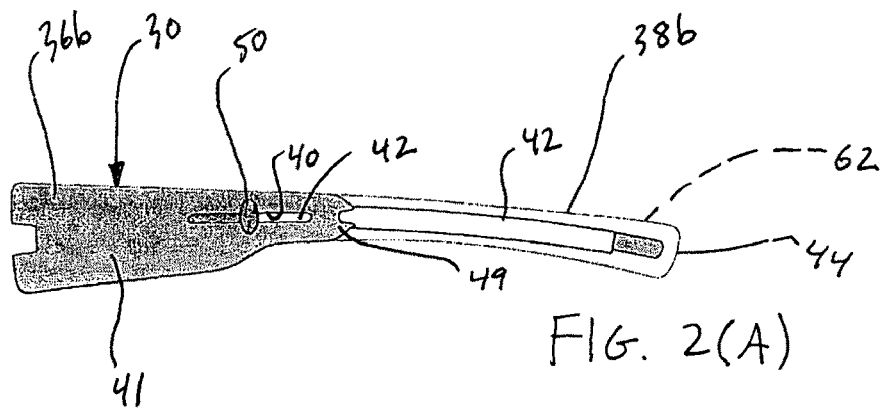
FIG. 2(A) is a side view of a temple piece of the eyeglass of FIG. 1(A).

Reference is now made to FIG. 2(A), which shows further detail of the right temple piece 30, from which details of the left temple piece 28 also will be understood. Shown are the proximal portion 36b, the distal portion 38b, and the slot 40. The slot 40 defines a longitudinal range of adjustability of a leaf spring 42 that is nested in a longitudinal cavity 56 (described later below in relation to FIG. 2(C)) extending from the slot substantially to the terminus 44 of the distal end 38b.

Figure 2B:
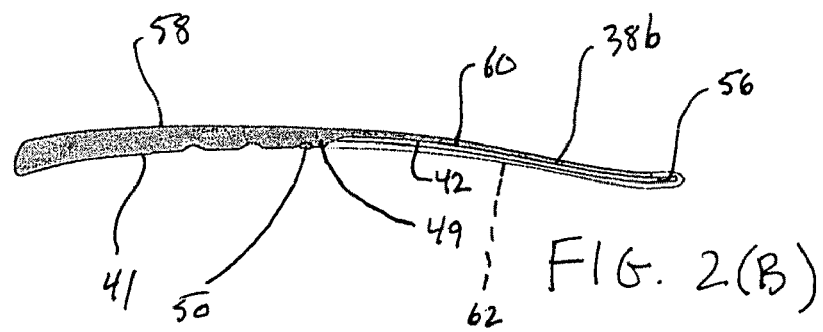
FIG. 2(B) shows a top view and a side view of a leaf spring of the eyeglass of FIG. 1(A).
Figure 2C:
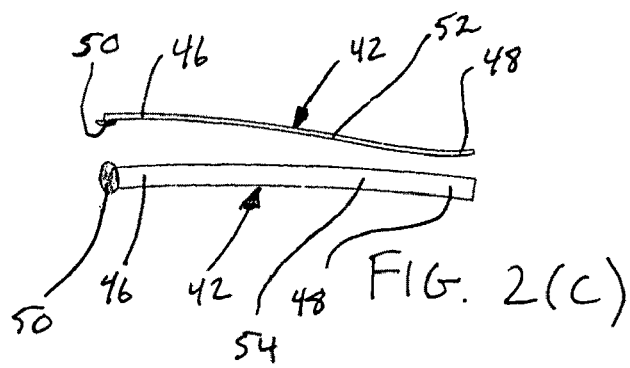
FIG. 2(C) is a top view of the temple piece of FIG. 2(A).

Turning now to FIG. 2(C), details of the leaf spring 42 are shown. The leaf spring 42 desirably is made of strong spring steel and includes a proximal end 46 and a distal end 48. The proximal end 46 includes a bump or nubbin 50 that is configured to protrude into the slot 40 for manual accessibility from outside the slot and to slide along the length of the slot. Along its length from the proximal end 46 to the distal end 48, the leaf spring 42 has a permanent inwardly lateral flex 52 and, as shown in FIG. 2(C), a permanent downward bend 54 when installed in the eyeglass 10. The degree of downward bend 54 follows the downward bend of the distal portion 38b. If, as in some implementations, the distal portion 38b is substantially straight, i.e., has no or a negligible amount of downward bend, the leaf spring 42 has no downward bend 54 or the downward bend 54 is also negligible.

Substantially the entire length of the leaf spring 42 is nested, in a slip-fit manner, in the longitudinal cavity 56 (FIG. 2(B)). The longitudinal cavity 56 is formed in and, in some instances, enclosed within the right temple piece 30 (FIGS. 2(A)-2(B)). The cavity 56 is formed in the distal portion 38b and, in some implementations, the proximal portion 36b of the right temple piece 30.

On an outer side 58 of the distal portion 38b, the portion of the cavity 56 in the distal portion 38b is bounded by a tongue-like extension 60 of the rigid material of the proximal end 36b (FIG. 2(B)). The remainder of the cavity 56 is bounded by a compliant portion 62 of the distal portion 38b made of a relatively soft material. The extension 60 is at least partially laterally flexible, but desirably is more laterally rigid than the material of the compliant portion 62 such that the extension 60 provides a backing surface for lateral flexure of the leaf spring 42. The material of the compliant portion 62 can flex laterally (inwardly toward the wearer's head) under the lateral stress imparted to the compliant portion by flexure of the leaf spring 42 as backed by the extension 60.

The portion of the cavity 56 in the proximal portion 36b is formed within the rigid material, i.e., the cavity is bounded by the rigid material on the inner and outer sides 41, 58, respectively, of the proximal portion. Accordingly, at least a portion of the leaf spring 42, e.g., the proximal end 46, is backed and fronted by rigid material to provide a fulcrum for the leaf spring as will be explained in more detail below.

Figure 2D:
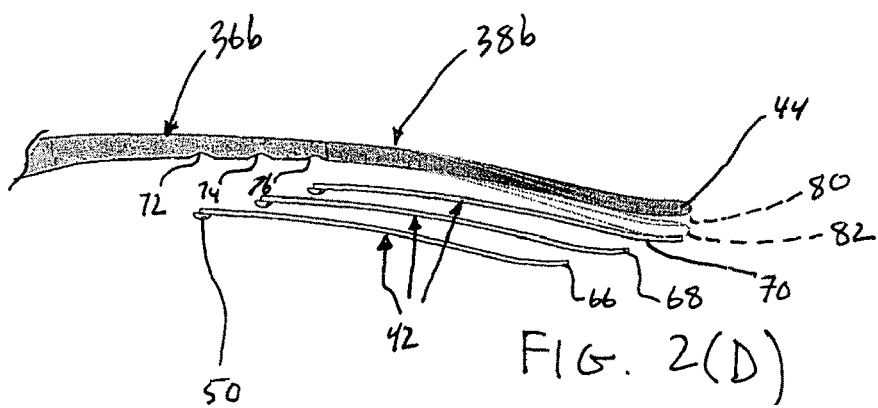
FIG. 2(D) is a fragmentary top view of the temple piece of FIG. 2(A) showing various leaf-spring positions as represented by leaf springs removed from the temple piece.

The degree of lateral movement of the compliant portion 62 urged by the leaf spring 42 is determined by the longitudinal position of the leaf spring in the cavity 56. Turning now to FIG. 2(D), in this embodiment the leaf spring 42 has three selectable positions 66, 68, 70 (leaf-spring positions shown by depicting the leaf spring 42 removed from the cavity 56, but it will be understood that these positions 66, 68, 70 represent actual corresponding positions of the leaf spring in the cavity). The positions 66, 68, 70 are established by sliding the leaf spring 42 in the cavity 56. The position of the leaf spring 42 in the cavity 56 is established by a corresponding position of the bump 50 in the slot 40. To hold the bump 50 at a selected position, the slot 40 is provided with corresponding detents 72, 74, 76 configured to engage the bump 50. Thus, whenever the leaf spring 42 is in the first position 66, the bump 50 is engaged in the first detent 72; whenever the leaf spring is in the second position 68, the bump is engaged in the second detent 74; and whenever the leaf spring is in the third position 70, the bump is engaged in the third detent 76.

The position of the leaf spring 42 has a direct impact on the lateral position of the terminus 44 of the distal portion 38b. More specifically, referring to FIG. 1(B), whenever the leaf spring 42 is in the first position 66 (detent 72), the terminus 44 of the distal portion 38b is in a first lateral-flex position 78; whenever the leaf spring is in the second position 68 (detent 74), the terminus of the distal portion 38b is in a second lateral-flex position 80; and whenever the leaf spring is in the third position 70 (detent 76), the terminus of the distal portion 38b is in a third lateral-flex position 82.

The different lateral-flex positions of the terminus 44 of the distal portion 38b are accomplished by a fulcrum 49 (FIGS. 2(A)-2(B)). The fulcrum 49 is the distal end of the inner side 41 of the proximal portion 36b, or a location on the inner side 41 of the rigid material of the respective temple piece 28, 30 just prior to transitioning into the flexible material of the compliant portion 62. Thus, the fulcrum 49 contacts the leaf spring 42 and impacts the degree of flex of the leaf spring. More specifically, the closer the fulcrum 49 is located to the proximal end 46 of the leaf spring 42, the more the spring is allowed to bend into its natural permanent inwardly lateral flex. Correspondingly, the further away the fulcrum 49 is located from the proximal end 46 of the spring 42, the less the spring is allowed to bend since the flex of the portion of the spring between the fulcrum and the proximal end 46 is restricted by the combination of the fulcrum and the inner and outer sides of the proximal portion 36b bounding the spring. Therefore, as the proximal end 46 of the spring 42 is placed closer to the fulcrum 49, e.g., position 70, the spring is allowed greater inwardly lateral flex. As the proximal end 46 is placed further away from the fulcrum 49, e.g., position 66, the spring is allowed lesser inwardly lateral flex.

For example, in the third lateral-flex position 82, the distal portion 38b is laterally "bent" maximally toward the wearer's head for a tighter fit (or a more comfortable fit, more conforming, or more suitable fit for some wearers). In the first lateral-flex position 78, the distal portion 38b is laterally "bent" minimally toward the wearer's head for a looser fit (or a more comfortable fit, more conforming fit, or more suitable fit for other wearers). In all these lateral-flex positions 78, 80, 82, the leaf spring 42, being made of spring steel or the like, creates a corresponding lateral bend in the distal portion of the temple piece.

In use, the fit of the eyeglass 10 can be easily adjusted by moving a leaf spring 42 with respect to a respective distal portion 38a, 38b. According to one embodiment, this is accomplished by applying a pressure to the bump 50 of the leaf spring 42 in a longitudinal direction, i.e., a first longitudinal direction 84 or a second longitudinal direction 86, with respect to the temple piece 30. As described above, engagement between the bump 50 and a detent, such as detent 74, resists movement of the bump relative to the detent to maintain the spring 42 in a first position. However, once the pressure applied to the bump 50 exceeds a predetermined threshold, the bump moves within the slot 40 in the longitudinal direction relative to and out of engagement with the detent. The user can continue to move the bump 50 (and thus the spring 42) in the longitudinal direction by maintaining pressure on the bump until the bump engages an adjacent detent to place the spring in a second position that is spaced apart from the first position. In other words, the spring is moved from a first position in which the distal portion 38b is in a first lateral-flex position to a second position in which the distal portion is in a second lateral-flex position laterally spaced-apart from the first lateral-flex position.

More specifically, in one embodiment, a user desiring to loosen the fit of the eyeglass to the user's head can move the bump 50 in the first longitudinal direction 84 (FIG. 2(A)) from one detent to another detent, such as from detent 74 to detent 72, or from detent 76 to detent 74 or detent 76. Similarly, if the user desires to tighten the fit of the eyeglass to the user's head, the user can move the bump 50 in the second longitudinal direction 86 (FIG. 2(A)) from one detent to another detent, such as from detent 72 to detent 74 or detent 76, or from detent 74 to detent 76.

In an alternative embodiment, the detents 72, 76, 76 are absent, allowing the leaf springs 42 to be continuously adjustable over the entire range provided by the slots 40. With such a configuration, the wearer simply moves the leaf springs 42, by manually engaging the bumps 50 thereof, to any desired position in the respective slots 40. In this configuration the leaf springs 42 desirably engage their respective cavities 56 with a tighter slip fit so that the leaf springs stay in position, especially over time.

In yet another embodiment, the number of detents is increased to greater than three. The number of detents that can be accommodated is limited in a practical sense by the length of the slot 40 and by the size of each bump 50. In yet another embodiment, as few as two detents are provided per slot 40.

The bumps 50 desirably are sufficiently small and short to avoid, as the bumps protrude from the respective slots 40, pressing into the respective sides of the wearer's head.

In embodiments with the slots formed in an outer side of the temple pieces 28, 30, bumps protrude from the respective slots outwardly away from the wearer's head. Accordingly, although perhaps not as aesthetically or stylistically appealing as the illustrated embodiments, such a configuration reduces the possibility of the bumps being pressed into the wearer's head.

In some implementations, the user adjusts the fit of the eyeglass 10 when the eyeglass is removed from the user's face.

In other implementations, the user can adjust the fit of the eyeglass 10 when the eyeglass is being worn by the user. In this manner, a wearer can adjust the fit of the eyeglasses while engaged in an activity. In other words, the wearer need not stop an activity, take off the eyeglass 10, adjust the leaf spring 42, and put on the eyeglass back on, in order to adjust the fit of the eyeglass. Rather, the eyeglass 10 can remain on the wearer's face during adjustment.

The temple pieces 28, 30, and thus the positioning of the distal portions 38a, 38b, can be adjusted for suitability to a particular activity. For example, if the wearer is about to engage in active sports in which it is important for the eyeglass 10 to remain on the wearer's face, then the wearer can adjust the leaf springs 42 on one or both temple pieces to a "tighter" position, such as the third position 70. On the other hand, if the same wearer is engaged in more quiescent activity, then the leaf springs 42 can be moved to a "looser" position, such as the first position 66, at which the distal portions 38a, 38b are less flexed and potentially more comfortable.

In addition, different wearers can adjust the positioning of the distal portions 38a, 38b to provide sufficient flex (and thus fit and comfort) for their respective heads and any outerwear, such as a helmet, that may be worn. Generally, when eyeglasses are properly worn, at least a portion of the temple pieces are positioned between a respective ear and the wearer's head and rest at least partially on a respective ear. Further, when helmets are also worn, some helmets can apply an inwardly directed pressure on the wearer's ears, which can cause the ears to move inwardly toward the wearer's head. If the temple portions are bulky, non-conforming, or include extraneous attachments, such as wrap-around cords, the ears can move into contact with and press up against the temple pieces of the eyeglass and the temple pieces can in turn press up against the wearer's head. The pressure applied to the ears and the head by the temple pieces can be uncomfortable and often painful. With certain eyeglasses, the level of discomfort is such that some wearers will not wear eye protection devices at all if they are wearing a helmet. Alternatively, some wearers will wear over-the-helmet goggles, which can be unstylish, cumbersome, and difficult to use, instead of eyeglasses.

In contrast to many conventional eyeglasses, the eyeglass 10 provides a comfortable and relatively tight fit while reducing discomfort associated with wearing eyeglasses in conjunction with a helmet. More specifically, the interaction and adjustability of the leaf spring 42 and respective distal portions 38a, 38b can provide a tight fit against the wearer's head without the need for extraneous attachment devices, which may accentuate discomfort when wearing a helmet. Also, the thin profile, of the distal portions 38a, 38b reduces the possibility of the wearer's ears being uncomfortably pressed up against the distal portions and the distal portions being uncomfortably pressed up against the wearer's head when wearing a helmet.

In one embodiment, a wearer can adjust the fit of the eyeglass 10 for use with a helmet or other headgear. For example, the wearer can move respective leaf springs 42 into one of several positions to place respective distal portions 38a, 38b into one of several corresponding lateral-flex positions to provide a comfortable fit for use with a helmet. The wearer can then comfortably don a helmet over at least a portion of the wearer's head including the ears and at least a portion of the temple pieces 28, 30.

Whereas the foregoing description is in the context of representative embodiments, the invention is not limited to those embodiments. On the contrary, the invention is intended to encompass all modifications, alternatives, and equivalents as may be included in the spirit and scope of the invention, as defined by the appended claims.

We claim:

1. Eyewear, comprising:
a frame; and
respective spaced-apart temple portions coupled to the frame, each temple portion comprising a proximal portion, a distal portion, and a biasing element movable along at least the distal portion in a longitudinal direction of the temple portion;
wherein each biasing element urges the distal portion of the respective temple portion in a lateral direction, generally perpendicular to the longitudinal direction, as the biasing element is moved along the distal portion.

2. The eyewear of claim 1, wherein each biasing element is an elongate leaf spring.

3. The eyewear of claim 1, wherein the biasing elements urge the respective distal portions of the temple portions toward or away from each other.

4. The eyewear of claim 1, wherein each temple portion comprises a respective detent mechanism matingly engageable with the respective biasing element to retain the biasing element adjustably in one of at least two positions.

5. The eyewear of claim 4, wherein the detent mechanism is matingly engageable with the respective biasing element to retain the biasing element adjustably in any of an infinite number of positions.

6. The eyewear of claim 1, wherein the biasing element is selectively movable into one of at least two positions along the distal portion.

7. The eyewear of claim 6, wherein:
when the biasing element is in a first of the at least two positions, the distal portion is in a first lateral-flex position; and
when the biasing element is in a second of the at least two positions, the distal portion is in a second lateral-flex position.

8. The eyewear of claim 1, wherein:
each temple portion comprises a cavity; and
at least a portion of a respective biasing element is slidably retained within the cavity.

9. The eyewear of claim 8, wherein:
the distal portion of each temple portion comprises an outer portion made of a first material and an inner portion made of a second material;
the second material is more flexible than the first material; and
the cavity is defined between the outer portion and the inner portion.

10. A temple piece for use with eyewear, comprising:
an elongate body having a first end and a second end and extending longitudinally from the first end to the second end, the body further defining an elongate cavity extending at least partially between the first and second ends; and
an elongate leaf spring having first and second ends and extending longitudinally from the first end to the second end, the leaf spring being at least partially positioned within the elongate cavity such that the second end of the leaf spring is closer than the first end to the second end of the body, the leaf spring further being slidable toward and away from the respective first and second ends of the body, and the second end of the leaf spring being biased in a first direction relative to the first end of the leaf spring;
wherein, as the leaf spring slides toward the second end of the body, the second end of the leaf spring urges the second end of the body in the first direction, and as the leaf spring slides toward the first end of the body, the second end of the leaf spring urges the second end of the body in a second direction generally opposite the first direction.

11. The temple piece of claim 10, wherein the elongate body comprises a proximal portion extending from the first end and a distal portion extending from the second end, and wherein the proximal portion is made from a first material and the distal portion comprises an outer side portion made from the first material and an inner side portion made from a second material more flexible than the first material.

12. The temple piece of claim 11, wherein the cavity is defined at least partially between the outer side portion and the inner side portion of the distal portion.

13. The temple piece of claim 10, wherein the body defines a slot extending along at least a portion of the elongate cavity, and wherein the elongate leaf spring comprises a user-engaging portion extending through and movable within the slot, the user-engaging portion being manipulatable by a user to adjust the position of the leaf spring relative to the body.

14. The temple piece of claim 13, wherein the body comprises at least two detents adjacent the slot, the detents being configured to engage and at least partially retain the user-engaging portion of the leaf spring.

15. The temple piece of claim 13, wherein the slot is positioned on an inner side of the body, and the user-engaging portion extends at least partially from the inner side of the body.

16. The temple piece of claim 10, wherein the leaf spring is longitudinally slidable between (i) a first longitudinal position in which the second end of the body is urged into a first lateral position, and (ii) a second longitudinal position longitudinally spaced apart from the first longitudinal position and in which the second end of the body is urged into a second lateral position laterally spaced apart from the first lateral position.

17. The temple piece of claim 10, wherein the leaf spring is selectively adjustable into one of at least two positions relative to the body to place the second end of the body in a corresponding one of at least two positions relative to the first end of the body.

18. A method for adjusting fit of an eyewear to a wearer, comprising:

providing an eyewear comprising a lens portion and respective spaced-apart temple portions coupled to the lens portion, wherein each temple portion comprises a spring selectively movable in a longitudinal direction and biased to urge a distal portion of the respective temple portion in a direction substantially transverse to the longitudinal direction; and moving the movable spring of at least one of the temple portions in the longitudinal direction to urge the distal portion of said at least one of the temple portions in the transverse direction.

19. The method of clam 18, wherein moving comprises moving the movable spring of one temple portion in the longitudinal direction to urge the distal portion of said one temple portion in the transverse direction toward the other of the temple portions.

20. The method of clam 18, wherein moving comprises moving the movable spring of one temple portion in the longitudinal direction to urge the distal portion of said one temple portion in the transverse direction away from the other of the temple portions.

21. The method of claim 18, wherein each of the spaced-apart temple portions comprises a detent mechanism having at least two detents engageable with a portion of the spring to at least partially retain the spring in a respective one of at least two longitudinal positions and at least partially maintain the distal portion in a corresponding one of at least two lateral-flex positions, the method further comprising disengaging said portion of the spring from a first detent and engaging said portion of the spring with a second detent to move the distal portion from a first lateral-flex position to a second lateral-flex position.

* * * * *

UNITED STATES PATENT AND TRADEMARK OFFICE
CERTIFICATE OF CORRECTION

PATENT NO. : 7,520,606 B2  Page 1 of 1
APPLICATION NO. : 11/715070
DATED : April 21, 2009
INVENTOR(S) : John E. G. Hogen and Johnny Garfield Wong It is certified that error appears in the above-identified patent and that said Letters Patent is hereby corrected as shown below:

In the claims, column 11, line 20, claim 19, "clam" should read --claim--.

In the claims, column 12, line 4, claim 20, "clam" should read --claim--.

Signed and Sealed this

Second Day of June, 2009

JOHN DOLL
*Acting Director of the United States Patent and Trademark Office*